(12) United States Patent
Kjellman et al.

(10) Patent No.: US 11,698,196 B2
(45) Date of Patent: Jul. 11, 2023

(54) EXHAUST HOOD WEIGHT SENSOR

(71) Applicant: CARRIER CORPORATION, Palm Beach Gardens, FL (US)

(72) Inventors: Thomas Carl Kjellman, Uxbridge, MA (US); Melissa B. Avila, Millbury, MA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 391 days.

(21) Appl. No.: 17/059,834

(22) PCT Filed: May 13, 2019

(86) PCT No.: PCT/US2019/031988
§ 371 (c)(1),
(2) Date: Nov. 30, 2020

(87) PCT Pub. No.: WO2019/231654
PCT Pub. Date: Dec. 5, 2019

(65) Prior Publication Data
US 2021/0215348 A1 Jul. 15, 2021

Related U.S. Application Data

(60) Provisional application No. 62/679,541, filed on Jun. 1, 2018.

(51) Int. Cl.
*G01G 19/52* (2006.01)
*F24C 15/20* (2006.01)

(52) U.S. Cl.
CPC ......... *F24C 15/2021* (2013.01); *G01G 19/52* (2013.01)

(58) Field of Classification Search
CPC ............................ G01G 19/52; F24C 15/2021
See application file for complete search history.

(56) References Cited

U.S. PATENT DOCUMENTS

| 1,176,075 A | 3/1916 | Mann |
| 4,987,882 A | 1/1991 | Kaufman |
| 8,847,776 B2 * | 9/2014 | O'Neill ............. H04M 1/72403 340/686.1 |

FOREIGN PATENT DOCUMENTS

| AU | 2018201603 A1 | 6/2012 |
| CN | 2446394 Y | 9/2001 |
| CN | 101799314 A | 8/2010 |
| CN | 201594007 U | 9/2010 |
| CN | 102730539 | 6/2012 |
| CN | 203687137 U | 10/2013 |
| CN | 203949235 U | 11/2014 |
| CN | 205655367 U | 10/2016 |

(Continued)

OTHER PUBLICATIONS

Computer translation of CN 206 281 021 produced Feb. 15, 2023.*

(Continued)

*Primary Examiner* — Randy W Gibson
(74) *Attorney, Agent, or Firm* — Cantor Colburn LLP

(57) ABSTRACT

A ventilation hood system is provided. The ventilation hood system includes a hood body defining an interior through which cooking vapors are passable, a support system affixed to a fixed body and supportive of an entire weight of the hood body and a weight sensing system operably coupled to the support system to sense and monitor the entire weight of the hood body over time.

20 Claims, 4 Drawing Sheets

(56) References Cited

FOREIGN PATENT DOCUMENTS

| | | |
|---|---|---|
| CN | 206556741 U | 3/2017 |
| CN | 206281021 U | 6/2017 |
| DE | 4105004 A1 | 8/1992 |
| DE | 102014004129 A1 | 9/2015 |
| JP | 2630172 B2 | 7/1997 |
| JP | 2005049074 A | 2/2005 |
| KR | 100600002 B1 | 7/2006 |
| WO | 9723757 A1 | 7/1997 |
| WO | 0118514 A1 | 3/2001 |

OTHER PUBLICATIONS

International Search Report Application No. PCT/US2019/031988; dated Jul. 11, 2019; pp. 5.
Written Opinion Application No. PCT/US2019/031988; dated Jul. 11, 2019; pp. 12.

\* cited by examiner

EXHAUST HOOD WEIGHT SENSOR

BACKGROUND

The following description relates to exhaust hoods and, more specifically, to exhaust hoods with weight sensors for detection of grease build-up.

In commercial cooking applications, the ventilation hood system can become caked with grease and should be cleaned periodically. Often, the cleaning schedule is based on a standard time period when a certain amount of grease is expected to be deposited from grease-laden cooking vapors and can lead to cleanings that are either done before an excessive amount of grease has been deposited or cleanings that are delayed. That is, if the cleanings are scheduled regularly and without reference to actual grease levels, there exists a potential that the hood is cleaned more or less often than needed. If the cleanings are too frequent, the cleanings can be a costly and time-consuming whereas if the cleanings are too infrequent there could be a time period where the hood has more than a safe amount of grease deposition.

While spot-check sensors are available for checking grease levels, such spot-check sensors do not provide indications of how much grease is present in a whole ventilation hood system.

BRIEF DESCRIPTION

According to an aspect of the disclosure, a ventilation hood system is provided. The ventilation hood system includes a hood body defining an interior through which cooking vapors are passable, a support system affixed to a fixed body and supportive of an entire weight of the hood body and a weight sensing system operably coupled to the support system to sense and monitor the entire weight of the hood body over time.

In accordance with additional or alternative embodiments, the hood body includes duct sidewalls enclosing the interior and a screen through which the cooking vapors are passable, the screen being disposed in the interior and supported by the duct sidewalls.

In accordance with additional or alternative embodiments, the support system includes one or more support legs.

In accordance with additional or alternative embodiments, each of the one or more support legs is located at a corner of the hood body.

In accordance with additional or alternative embodiments, each of the one or more support legs includes a first load bearing member affixed at a first end thereof to the hood body, a second load bearing member affixed at a first end thereof to the fixed body and a bracket connecting respective second ends of the first and second load bearing members.

In accordance with additional or alternative embodiments, the weight sensing system includes weight sensors respectively disposed in a bracket of a corresponding one of the one or more support legs and each weight sensor is configured to sense a portion of the entire weight of the hood body which is supported by the corresponding one of the one or more support legs.

In accordance with additional or alternative embodiments, each weight sensor includes at least one of a load cell and a strain gauge.

In accordance with additional or alternative embodiments, each weight sensor is operably interposed between the first load bearing member and the bracket of the corresponding one of the one or more support legs.

In accordance with additional or alternative embodiments, the weight sensing system includes a weight monitor configured to receive data reflective of the entire weight of the hood body over time, interpret the data to monitor changes in the entire weight of the hood body over time and take an action toward cleaning the hood body in an event the changes indicate that the entire weight of the hood body exceeds a predefined level.

In accordance with additional or alternative embodiments, the weight sensing system further includes a spot-check sensor configured to execute spot-checks of the hood body and the weight monitor is further configured to take the action toward cleaning the hood body in an event the spot-check sensor indicates that the action should be taken irrespective of the changes indicating that the entire weight of the hood body exceeds the predefined level.

According to an aspect of the disclosure, a ventilation hood system is provided and includes a hood body defining an interior through which cooking vapors are passable, a support system affixed to a fixed body and supportive of an entire weight of the hood body and a weight sensing system. The support system includes support legs. Each support leg includes a first load bearing member affixed at a first end thereof to the hood body, a second load bearing member affixed at a first end thereof to the fixed body and a bracket connecting respective second ends of the first and second load bearing members. The weight sensing system is operably coupled to the support system to sense and monitor the entire weight of the hood body over time. The weight sensing system includes weight sensors respectively disposed in a bracket of a corresponding support leg and configured to sense a portion of the entire weight of the hood body supported thereby.

In accordance with additional or alternative embodiments, the hood body includes duct sidewalls enclosing the interior and a screen through which the cooking vapors are passable, the screen being disposed in the interior and supported by the duct sidewalls.

In accordance with additional or alternative embodiments, each support leg is located at a corner of the hood body.

In accordance with additional or alternative embodiments, each weight sensor includes at least one of a load cell and a strain gauge.

In accordance with additional or alternative embodiments, each weight sensor is operably interposed between the first load bearing member and the bracket of the corresponding support leg.

In accordance with additional or alternative embodiments, the weight sensing system includes a weight monitor configured to receive data reflective of the entire weight of the hood body over time from the weight sensors, interpret the data to monitor changes in the entire weight of the hood body over time and take an action toward cleaning the hood body in an event the changes indicate that the entire weight of the hood body exceeds a predefined level.

In accordance with additional or alternative embodiments, the weight sensing system further includes a spot-check sensor configured to execute spot-checks of the hood body and the weight monitor is further configured to take the action toward cleaning the hood body in an event the spot-check sensor indicates that the action should be taken irrespective of the changes indicating that the entire weight of the hood body exceeds the predefined level.

According to an aspect of the disclosure, a method of monitoring a cleanliness of a hood body of a ventilation hood system is provided. The method includes installing weight sensors at support legs of the hood body, sensing, at each weight sensor, a portion of an entire weight of the hood body which is supported by the corresponding support leg, generating data reflective of the entire weight of the hood body over time from results of the sensing, interpreting the data to monitor changes in the entire weight of the hood body over time and taking an action toward cleaning the hood body in an event the changes indicate that the entire weight of the hood body exceeds a predefined level.

In accordance with additional or alternative embodiments, the taking of the action includes scheduling the cleaning irrespective of a cleaning schedule.

In accordance with additional or alternative embodiments, the method further includes executing spot-checks of the hood body and taking the action toward cleaning the hood body in an event the executing of the spot-checks indicates that the action should be taken irrespective of the changes indicating that the entire weight of the hood body exceeds the predefined level.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, a system of load-cells is installed in a ventilation hood system (e.g., a commercial ventilation hood system) such that a total weight of the vent hood body can be sensed or measured and monitored over time. By way of a comparison between the measured weight and a baseline value, which is taken when the vent hood body is clean, a value of how much weight the vent hood body has gained over time can be determined. As it can be inferred that this weight gain would be at least partially due to a deposition of grease and other similar materials onto the inner surfaces of the vent hood body, the weight gain could be used to determine if the vent hood body is due for a cleaning.

Figure 2:
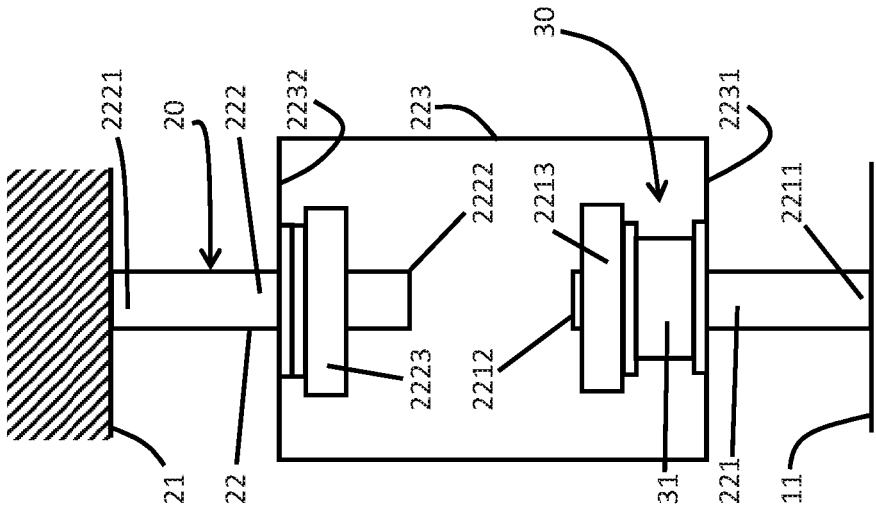
FIG. 2 is a schematic illustration of a support system bracket of the ventilation hood system of FIG. 1 and taken along line 2-2 of FIG. 1 in accordance with embodiments.
Figure 1:
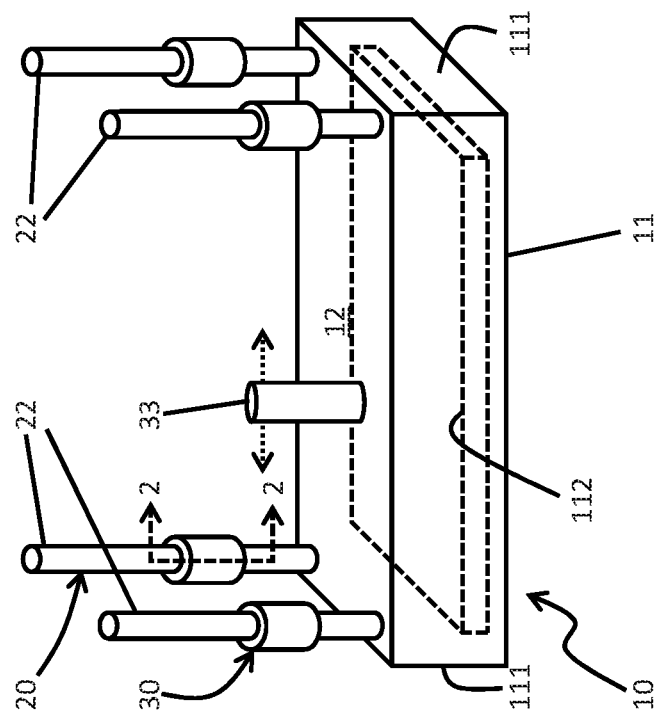
FIG. 1 is a perspective view of a ventilation hood system in a clean condition in accordance with embodiments.
Figure 3:
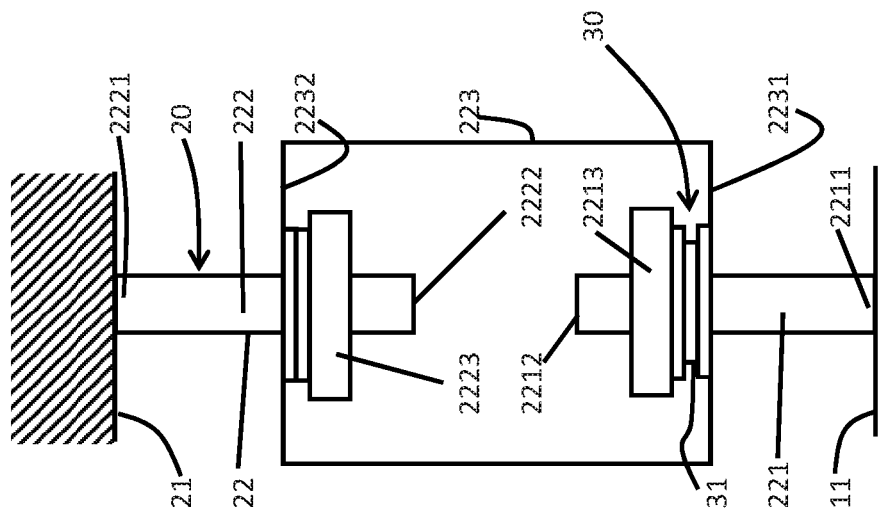
FIG. 3 is a perspective view of the ventilation hood system of FIG. 1 in a dirty condition in accordance with embodiments.
Figure 4:
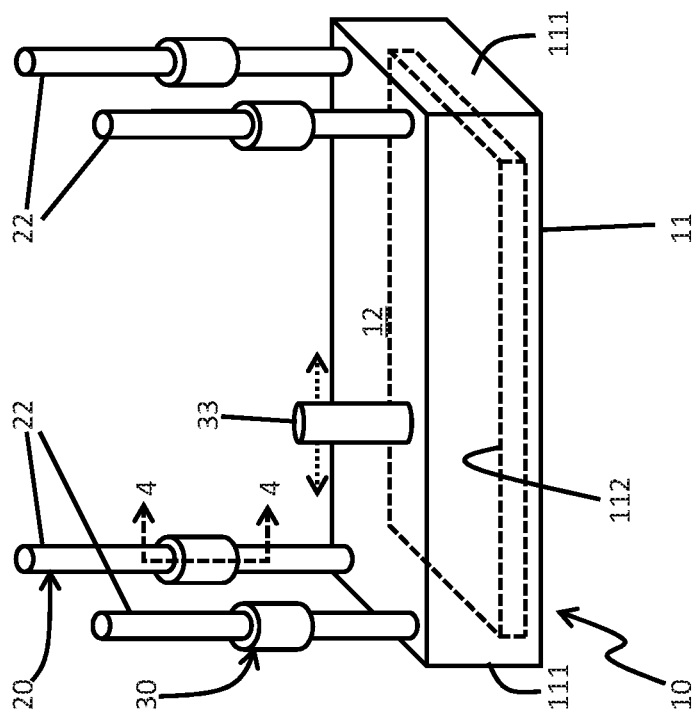
FIG. 4 is a schematic illustration of a support system bracket of the ventilation hood system of FIG. 3 and taken along line 4-4 of FIG. 3 in accordance with embodiments.

With reference to FIGS. 1 and 2 and to FIGS. 3 and 4, a ventilation hood system 10 is provided. The ventilation hood system 10 may be configured as a commercial ventilation system that can be used in a commercial kitchen of a restaurant or a hotel, for example. The ventilation hood system 10 includes a hood body 11. The hood body 11 includes duct sidewalls 111 and a screen 112. The duct sidewalls 111 are cooperatively formed to define and enclose an interior 12 through which cooking vapors or other vapors are passable. The cooking vapors can be generated by cooking operations conducted on a stove or another similar device located approximately beneath the hood body 11 and then driven through the interior 12 by a fan element or blower that is installed in or adjacent to the interior 12. The screen 112 may be disposed in the interior 12 and may be supported therein by the duct sidewalls 111. The screen 112 may include screening or filtering media and is positioned such that the cooking vapors pass through the screening or filtering media prior to being exhausted to an exterior.

As the cooking vapors often carry or are suffused with grease, the grease can be deposited on interior surfaces of the duct sidewalls 111 and the screen 112 over time. This leads to the duct sidewalls 111 and the screen 112, which have an initial or baseline weight when they are clean (see FIGS. 1 and 2), having an increased weight when they are dirty and in need of being cleaned but not necessarily periodically cleaned (see the extended legs 22 in FIG. 3 and the compressed weight sensing system 30 of 4). Thus, the following description relates to system components and methods that are directed toward measuring a weight gain of the hood body 11 as grease and other foreign materials or debris become caked on the interior surfaces of the duct sidewalls 111 and the screen 112 so that the entire weight of the hood body 11 increases over time and then making a determination as to when cleanings should be scheduled based, in at least some cases, at least partially on the weight gain of the hood body 11.

The ventilation hood system 10 further includes a support system 20 and a weight system 30. The support system 20 is generally affixed to a fixed body 21 (see FIGS. 2 and 4) and is supportive of an entire weight of the hood body 11. The weight sensing system 30 is operably coupled to the support system 20 and is configured to sense and monitor the entire weight of the hood body 11 over time.

In accordance with embodiments, the support system 20 includes one or more support legs 22. In cases in which the support system 20 includes only one support leg 22, the support leg 22 may be disposed in or proximate to a center of gravity of the hood body 11. In cases in which the support system 20 includes multiple support legs 22, the multiple support legs 22 may be positioned so as to support the hood body 11 substantially evenly. For example, in a case in which the support system 20 includes four support legs 22, the four support legs 22 may be respectively disposed at corresponding corners of the hood body 11.

Although the support system 20 can include one or more support legs 22, the following description will relate to the case in which the support system 20 includes a support leg 22 at each corner of the hood body 11 (see FIGS. 1 and 2). This is done for purposes of clarity and brevity and is not intended to otherwise limit a scope of the disclosure.

As shown in FIGS. 2 and 4, each of the support legs 22 includes a first load bearing member 221, a second load bearing member 222 and a bracket 223. The first load bearing member 221 has first and second opposite ends 2211 and 2212 and a head 2213 at the second end 2212. The first load bearing member 221 is affixed to the hood body 11 at the first end 2211. The second load bearing member 222 has first and second opposite ends 2221 and 2222 and a head 2223 at the second end 2222. The second load bearing member 222 is affixed to the fixed body 21 at the first end 2221. The bracket 223 is configured to connect respective second ends 2212 and 2222 of the first and second load bearing members 221 and 222 by way of mechanical interference between the heads 2213 and 2223 and first and second opposite end walls 2231 and 2232 of the bracket 223.

Each support leg 22 supports a portion of the entire weight of the hood body 11.

The weight sensing system 30 includes weight sensors 31 that are respectively disposed in the bracket 223 of a corresponding support leg 22. Each weight sensor 31 may include or be provided as at least one of a load cell and a strain gauge and is configured to sense the portion of the entire weight of the hood body 11 which is supported by the corresponding support leg 22. In accordance with embodiments, each weight sensor 31 may be operably interposed between the head 2213 of the first load bearing member 221 and the first end wall 2231 of the bracket 223 of the corresponding support leg 22 or between the second end wall 2232 of the bracket 223 and the head 2223 of the second load bearing member 222 of the corresponding support leg 22.

In either case, when the hood body 11 is clean and has its initial or baseline weight, each weight sensor 31 experiences an initial or baseline compressive load (see FIG. 2). Conversely, when the hood body 11 is dirty and has an increased weight, each weight sensor 31 experiences an increased compressive load (see FIG. 4). As such, while the initial or baseline compressive load of FIG. 2 can be used to derive the initial or baseline weight of the hood body 11, the increased compressive load of FIG. 4 can be used to derive the increased weight of the hood body 11 and to determine a cleanliness condition of the hood body 11.

Figure 5A:
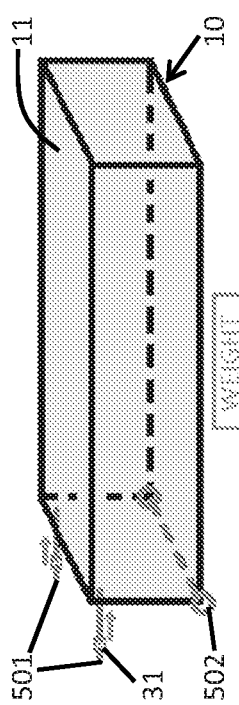
FIG. 5A is a perspective view of a ventilation hood system in accordance with alternative embodiments.
Figure 6A:
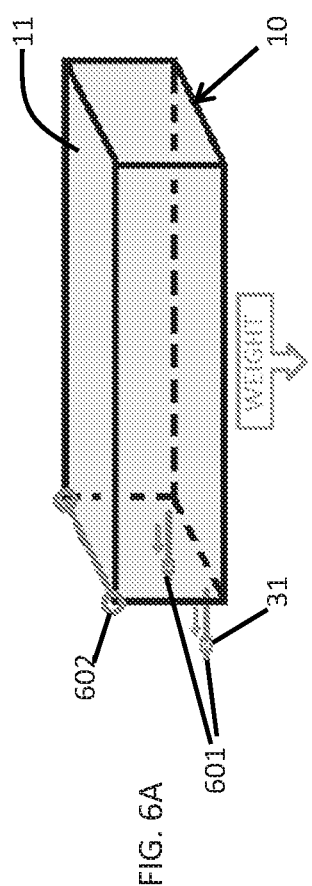
FIG. 6A is a perspective view of a ventilation hood system in accordance with alternative embodiments.
Figure 7A:
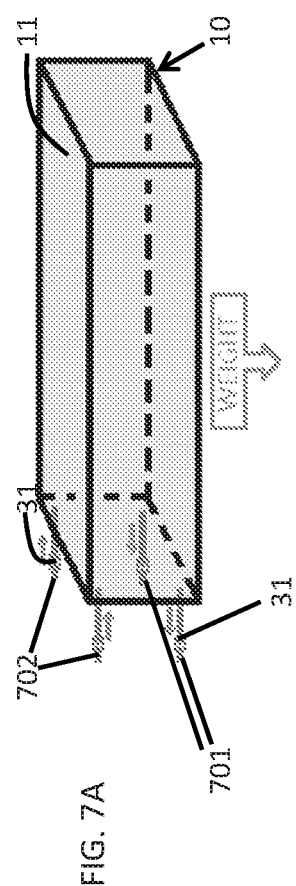
FIG. 7A is a perspective view of a ventilation hood system in accordance with alternative embodiments.
Figure 5B:
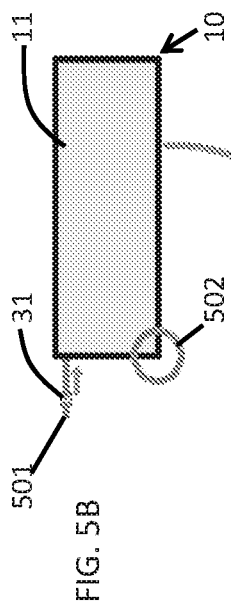
FIG. 5B is a side view of the ventilation hood system of FIG. 5A.
Figure 6B:
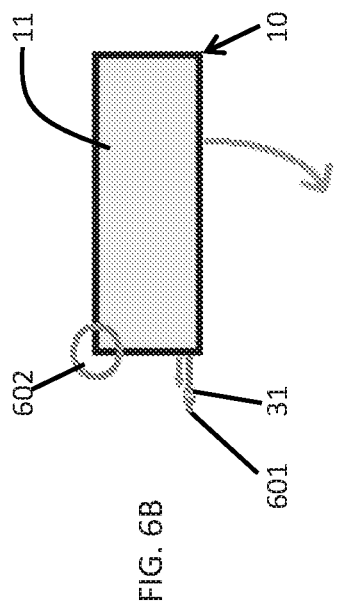
FIG. 6B is a side view of the ventilation hood system of FIG. 6A.
Figure 7B:
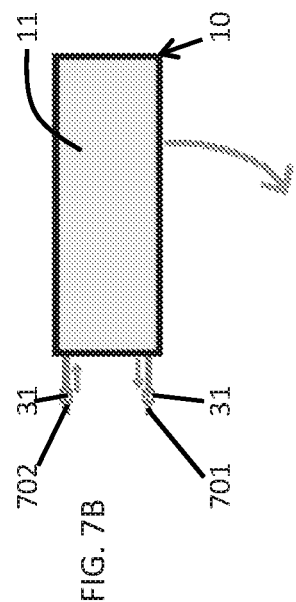
FIG. 7B is a side view of the ventilation hood system of FIG. 7A.

With reference to the cantilevering of FIGS. 5A and 5B, the cantilevering of FIGS. 6A and 6B and opposed cantilevering of FIGS. 7A and 7B, alternative embodiments of the ventilation hood system 10 are illustrated. As shown in FIGS. 5A and 5B, the hood body 11 can be supported at an upper edge thereof by lateral support legs 501 and at a lower edge thereof by a hinge 502 such that the lateral support legs 501 are placed in tension and the corresponding weight sensors 31 experience compression loading as described above to effectively sense a weight of the hood body 11. As shown in FIGS. 6A and 6B, the hood body 11 can be supported at a lower edge thereof by lateral support legs 601 and at an upper edge thereof by a hinge 602 such that the lateral support legs 601 are placed in compression and the corresponding weight sensors 31 experience torsional loading in a configuration that is generally opposite from what is described above but should be apparent to one of ordinary skill in the art to effectively sense a weight of the hood body 11. As shown in FIGS. 7A and 7B, the hood body 11 can be supported at a lower edge thereof by lateral support legs 701 and at an upper edge thereof by lateral support legs 702 such that the lateral support legs 701 are placed in compression and the corresponding weight sensors 31 experience the torsional loading while the lateral legs 702 are placed in tension and the corresponding weight sensors 31 experience the compression loading.

Figure 8:
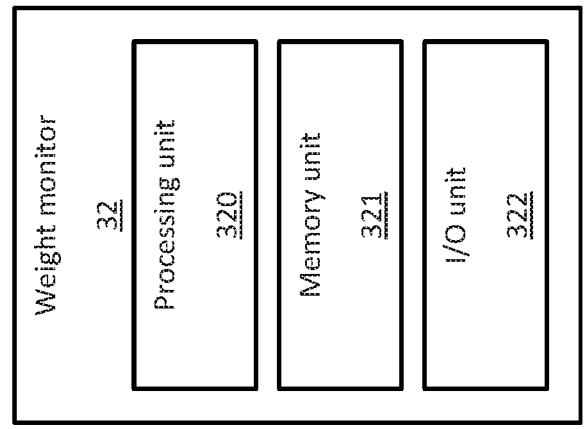
FIG. 8 is a schematic diagram of a weight monitor of the ventilation hood system of FIGS. 1-7B in accordance with embodiments.

With reference to FIG. 8, the weight sensing system 30 may further include a weight monitor 32 and, in some cases, one or more spot-check sensors 33 (see FIGS. 1 and 3). The weight monitor 32 may include or be provided as a computing device (fixed or portable) and includes a processing unit 320, a memory unit 321 and an input/output (I/O) unit 322 by which the processing unit 320 is communicative with the weight sensors 31 and, where applicable, the one or more spot-check sensors 33. The memory unit 321 has executable instructions stored thereon, which are readable and executable by the processing unit 320. When the executable instructions are read and executed by the processing unit 320, the executable instructions cause the processing unit 320 to operate as described herein.

When the executable instructions are read and executed by the processing unit 320, the executable instructions may cause the processing unit 320 to periodically request and receive data that is reflective of the portions of the entire weight of the hood body 11 over time that is supported by each support leg 22 from each of the weight sensors 31 and to calculate the entire weight of the hood body 11 over time from this data. In addition, when the executable instructions are read and executed by the processing unit 320, the executable instructions may further cause the processing unit 320 to interpret the data so as to monitor changes in the entire weight of the hood body 11 over time and to take an action toward cleaning the hood body 11 in an event the changes indicate that the entire weight of the hood body 11 exceeds a predefined level.

In accordance with embodiments, the predefined level may be set as a weight of the hood body 11 which is historically indicative of a dirty condition. The predefined level may be manually or automatically adjustable over time.

In accordance with embodiments and as shown in FIGS. 1 and 2, the one of more spot-check sensors 33 may be operable by the processing unit 320 in accordance with the executable instructions and configured to execute spot-checks of the hood body 11. The spot-check sensors 33 may be optical sensors or any other suitable type of sensor 33 that can be employed to inspect various components or locations of the hood body 11 for certain conditions, such as grease build-up. Here, the weight monitor 32 may be further configured to take the action toward cleaning the hood body 11 in an event the operations of the one or more spot-check sensors 33 indicate that the action should be taken irrespective of the changes indicating that the entire weight of the hood body 11 exceeds the predefined level. That is, in an event the spot-check sensors 33 find a dirty condition that needs to be cleaned even when the hood body 11 is not overweight, such as when the screen 112 is dirty but the duct sidewalls 111 are not yet dirty, the weight monitor 32 can take the action toward cleaning at least the screen 112.

Figure 9:
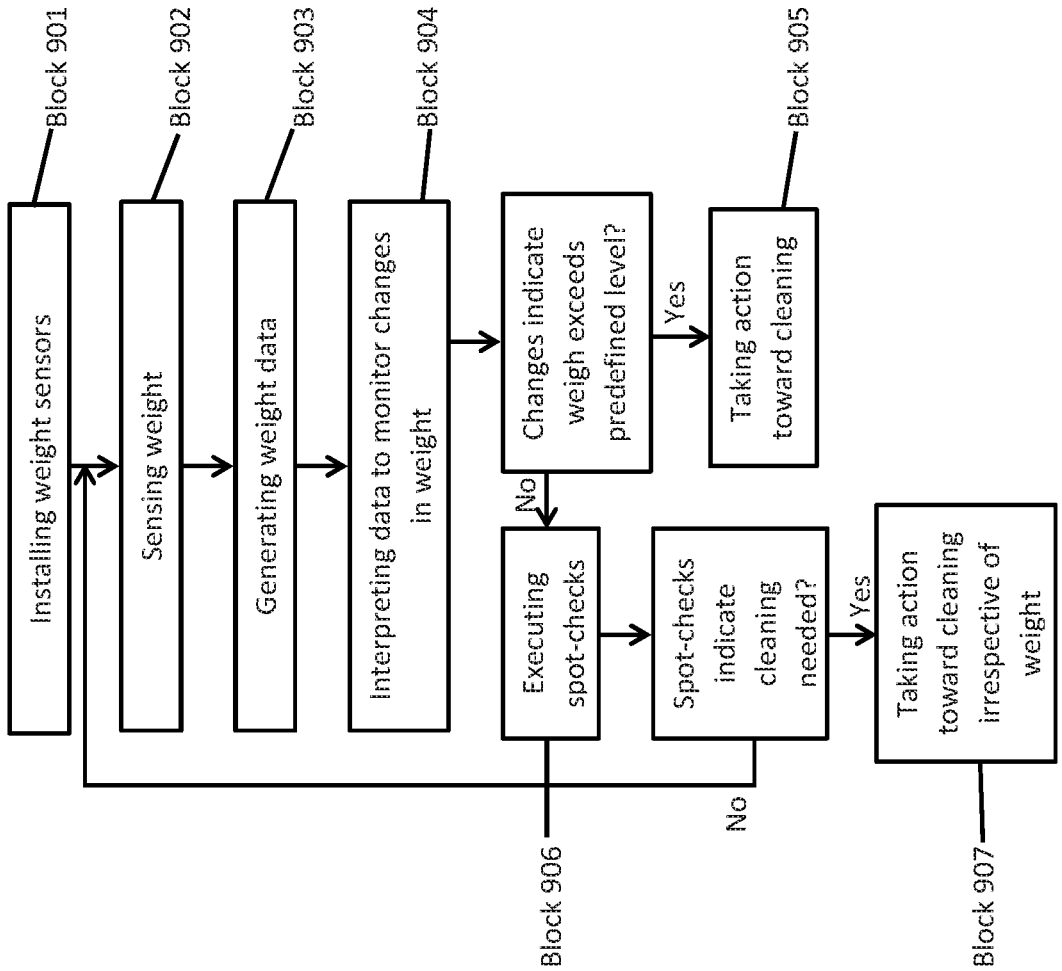
FIG. 9 is a flow diagram illustrating a method of monitoring a cleanliness of a hood body of a ventilation hood system in accordance with embodiments.

With reference to FIG. 9, a method of monitoring a cleanliness of the hood body 11 of the ventilation hood system 10 as described above is provided. As shown in FIG. 6, the method includes installing the weight sensors 31 at the support legs 22 of the hood body 11 (block 901), sensing, at each weight sensor 31, a portion of an entire weight of the hood body 11 which is supported by the corresponding support leg 22 (block 902) and generating data reflective of the entire weight of the hood body 11 over time from results of the sensing of block 902 (block 903). The method may further include interpreting the data to monitor changes in the entire weight of the hood body 11 over time (block 904) and taking an action toward cleaning the hood body 11 in an event the changes indicate that the entire weight of the hood body 11 exceeds the predefined level (block 905).

In accordance with embodiments, the interpreting of the data of block 904 may include comparing the data with baseline or prior data and the taking of the action of block 905 may include scheduling the cleaning irrespective of a cleaning schedule. Also, the method may further include executing spot-checks of the hood body 11 (block 906) and taking the action toward cleaning the hood body 11 in an event the executing of the spot-checks indicates that the action should be taken irrespective of the changes indicating that the entire weight of the hood body 11 exceeds the predefined level (block 907).

Technical effects and benefits of the disclosure are that cleanings of the vent hood body need not be scheduled regularly without reference to actual grease levels but, rather, can be scheduled based at least partially on a measurable factor that can be indicative of grease levels. As such, a potential that the vent hood body is cleaned more often than needed or not enough is reduced.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A ventilation hood system,
   a hood body defining an interior through which cooking vapors are passable;
   a support system affixed to a fixed body and supportive of an entire weight of the hood body; and
   a weight sensing system operably coupled to the support system to sense and monitor the entire weight of the hood body over time.

2. The ventilation hood system according to claim 1, wherein the hood body comprises:
   duct sidewalls enclosing the interior; and
   a screen through which the cooking vapors are passable, the screen being disposed in the interior and supported by the duct sidewalls.

3. The ventilation hood system according to claim 1, wherein the support system comprises one or more support legs.

4. The ventilation hood system according to claim 3, wherein each of the one or more support legs is located at a corner of the hood body.

5. The ventilation hood system according to claim 3, wherein each of the one or more support legs comprises:
   a first load bearing member affixed at a first end thereof to the hood body;
   a second load bearing member affixed at a first end thereof to the fixed body; and
   a bracket connecting respective second ends of the first and second load bearing members.

6. The ventilation hood system according to claim 3, wherein:
   the weight sensing system comprises weight sensors respectively disposed in a bracket of a corresponding one of the one or more support legs, and
   each weight sensor is configured to sense a portion of the entire weight of the hood body which is supported by the corresponding one of the one or more support legs.

7. The ventilation hood system according to claim 6, wherein each weight sensor comprises at least one of a load cell and a strain gauge.

8. The ventilation hood system according to claim 6, wherein each weight sensor is operably interposed between the first load bearing member and the bracket of the corresponding one of the one or more support legs.

9. The ventilation hood system according to claim 1, wherein the weight sensing system comprises a weight monitor configured to:
   receive data reflective of the entire weight of the hood body over time,
   interpret the data to monitor changes in the entire weight of the hood body over time, and
   take an action toward cleaning the hood body in an event the changes indicate that the entire weight of the hood body exceeds a predefined level.

10. The ventilation hood system according to claim 9, wherein:
    the weight sensing system further comprises a spot-check sensor configured to execute spot-checks of the hood body, and
    the weight monitor is further configured to take the action toward cleaning the hood body in an event the spot-check sensor indicates that the action should be taken irrespective of the changes indicating that the entire weight of the hood body exceeds the predefined level.

11. A ventilation hood system,
    a hood body defining an interior through which cooking vapors are passable;
    a support system affixed to a fixed body and supportive of an entire weight of the hood body, the support system comprising support legs that each comprise:
       a first load bearing member affixed at a first end thereof to the hood body;
       a second load bearing member affixed at a first end thereof to the fixed body; and
       a bracket connecting respective second ends of the first and second load bearing members; and
    a weight sensing system operably coupled to the support system to sense and monitor the entire weight of the hood body over time,
    the weight sensing system comprising weight sensors respectively disposed in a bracket of a corresponding support leg and configured to sense a portion of the entire weight of the hood body supported thereby.

12. The ventilation hood system according to claim 11, wherein the hood body comprises:
    duct sidewalls enclosing the interior; and
    a screen through which the cooking vapors are passable, the screen being disposed in the interior and supported by the duct sidewalls.

13. The ventilation hood system according to claim 11, wherein each support leg is located at a corner of the hood body.

14. The ventilation hood system according to claim 11, wherein each weight sensor comprises at least one of a load cell and a strain gauge.

15. The ventilation hood system according to claim 11, wherein each weight sensor is operably interposed between the first load bearing member and the bracket of the corresponding support leg.

16. The ventilation hood system according to claim 11, wherein the weight sensing system comprises a weight monitor configured to:
receive data reflective of the entire weight of the hood body over time from the weight sensors,
interpret the data to monitor changes in the entire weight of the hood body over time, and
take an action toward cleaning the hood body in an event the changes indicate that the entire weight of the hood body exceeds a predefined level.

17. The ventilation hood system according to claim 16, wherein:
the weight sensing system further comprises a spot-check sensor configured to execute spot-checks of the hood body, and
the weight monitor is further configured to take the action toward cleaning the hood body in an event the spot-check sensor indicates that the action should be taken irrespective of the changes indicating that the entire weight of the hood body exceeds the predefined level.

18. A method of monitoring a cleanliness of a hood body of a ventilation hood system, the method comprising:
installing weight sensors at support legs of the hood body;
sensing, at each weight sensor, a portion of an entire weight of the hood body which is supported by the corresponding support leg;
generating data reflective of the entire weight of the hood body over time from results of the sensing;
interpreting the data to monitor changes in the entire weight of the hood body over time, and
taking an action toward cleaning the hood body in an event the changes indicate that the entire weight of the hood body exceeds a predefined level.

19. The method according to claim 18, wherein the taking of the action comprises scheduling the cleaning irrespective of a cleaning schedule.

20. The method according to claim 18, further comprising:
executing spot-checks of the hood body; and
taking the action toward cleaning the hood body in an event the executing of the spot-checks indicates that the action should be taken irrespective of the changes indicating that the entire weight of the hood body exceeds the predefined level.

* * * * *